Figure 2:
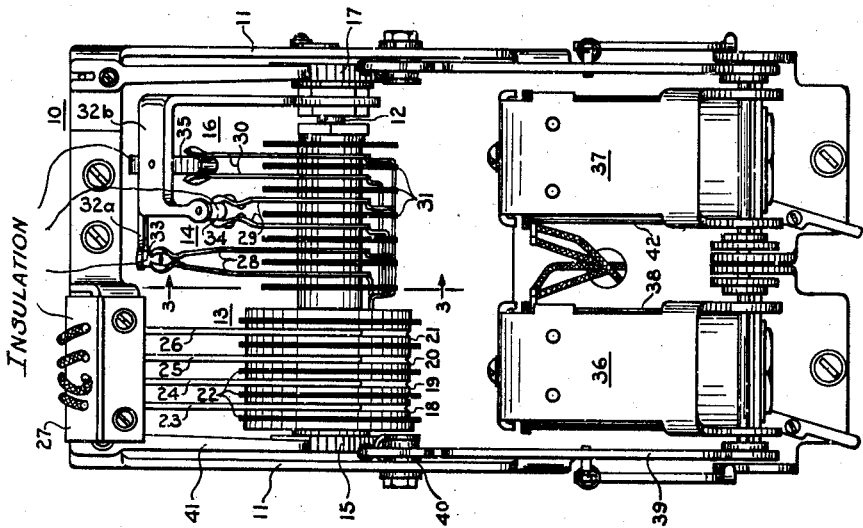

Dec. 19, 1939.  H. F. OBERGFELL  2,184,101
CIRCUIT CONTROLLING DEVICE
Filed Feb. 28, 1938   2 Sheets-Sheet 1

INVENTOR.
HERBERT F. OBERGFELL.
BY Davis, Lindsey, Smith & Shonts
ATTORNEYS.

Dec. 19, 1939.   H. F. OBERGFELL   2,184,101
CIRCUIT CONTROLLING DEVICE
Filed Feb. 28, 1938   2 Sheets-Sheet 2
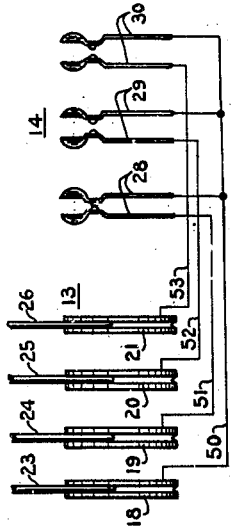
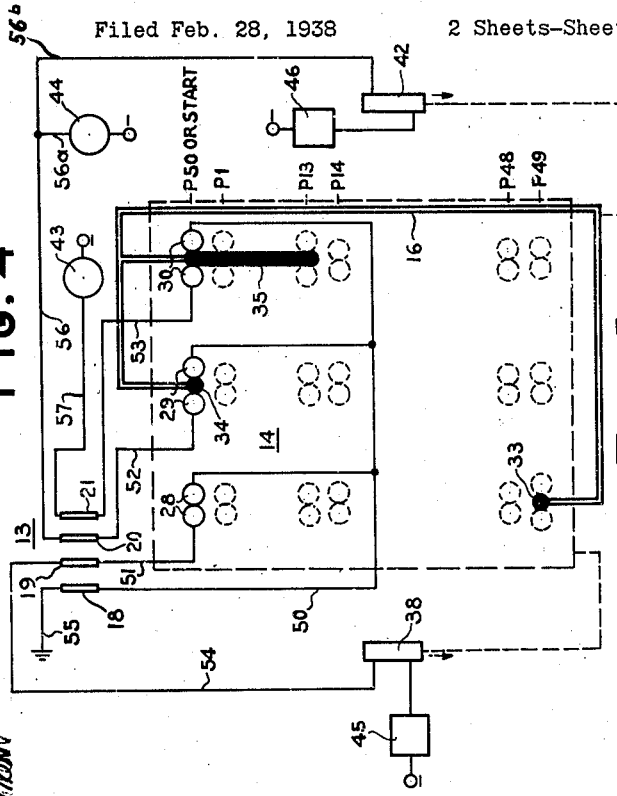
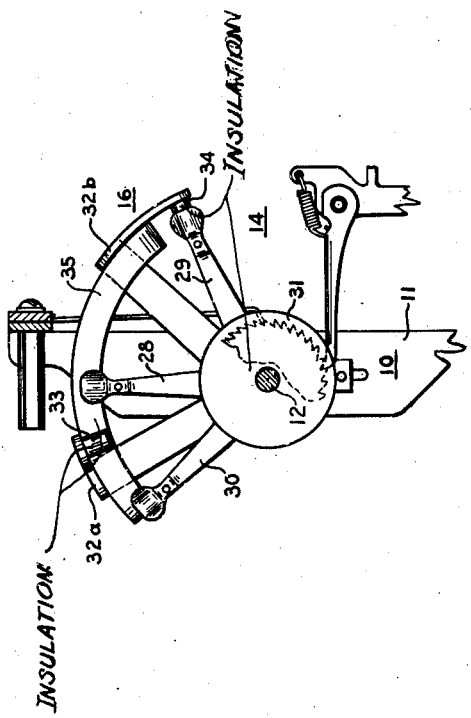
INVENTOR.
HERBERT F. OBERGFELL
BY Davis, Lindsey, Smith & Shonts
ATTORNEYS.

Patented Dec. 19, 1939

2,184,101

UNITED STATES PATENT OFFICE.

2,184,101

CIRCUIT CONTROLLING DEVICE

Herbert F. Obergfell, River Forest, Ill., assignor to Associated Electric Laboratories, Inc., Chicago, Ill., a corporation of Delaware Application February 28, 1938, Serial No. 192,960

10 Claims. (Cl. 200—105)

The present invention relates to circuit controlling devices and, more particularly, to cyclically operating devices of this character which include an arrangement for correlating with respect to numerical values a predetermined sequence of operations with a related predetermined sequence of operations, and which is adapted to control the operation of a device in accordance with the correlated numerical values of the predetermined sequences of operations.

A circuit controlling device of this general character is disclosed in United States Patent No. 2,057,911, Herbert F. Obergfell, granted October 20, 1936. This device comprises a movable contact set including a pair of cooperating contact members having open and closed contact positions, a movable element for mechanically controlling the contact position of the pair of cooperating contact members, a first mechanism operable to move the contact set, and a second mechanism operable to move the control element. The two mechanisms are of the stepping type and are operated in response to different predetermined sequences of operations which are to be correlated with respect to their numerical values. These mechanisms include ratchet wheels individual thereto, the ratchet wheels having the same number of equally spaced-apart teeth. The contact set comprises a rotatable structure which is moved from a start position step-by-step about an axis by the first mechanism. The control element is carried by a rotatable shaft which is moved from a start position step-by-step about the same axis by the second mechanism. The contact set and the control element are so constructed and arranged that the pair of cooperating contact members occupies an open contact position when the contact set and the control element occupy their start positions; that the pair of cooperating contact members occupies a closed contact position when the contact set is advanced any predetermined number of steps from its start position and with respect to the control element, and that the pair of cooperating contact members again occupies an open contact position when the control element is advanced this same predetermined number of steps from its start position.

In this circuit controlling device, if the first sequence of operations which causes the operation of the first mechanism comprises a number of operations which exceeds the number of teeth in the ratchet wheel in the first mechanism, the contact set is advanced step-by-step from its start position through 360 degrees back to its start position and then to some new advanced position corresponding to a relatively few teeth of the ratchet wheel. For example, if the first sequence of operations comprises fifty-two operations and there are fifty teeth in the ratchet wheel in the first mechanism, the contact set will occupy a position displaced a distance corresponding to two teeth of the ratchet wheel from its start position at the termination of the first sequence of operations. Obviously, the contact set will occupy this same position if the first sequence of operations comprises only two operations. Moreover, this circuit controlling device is so constructed and arranged that it is capable of controlling only one device in accordance with the correlated numerical values of the predetermined sequences of operations.

Accordingly, it is an object of the present invention to provide an improved circuit controlling device of the type described which embodies an arrangement for preventing the contact set thereof from being advanced from its start position forwardly and then back through its start position.

Another object of the invention is to provide an improved circuit controlling device of this character which is so constructed and arranged that it is capable of controlling, in a predetermined order, the operations of a plurality of devices in accordance with the correlated numerical values of predetermined sequences of operations.

It is a further and more specific object of the invention to provide an improved circuit controlling device of this character which is of simple construction, which comprises a minimum number of parts, and which is completely reliable in operation.

In general, the objects as set forth above are attained in accordance with the present invention by providing in a circuit controlling device of the character described a movable contact set including a pair of contact members having open and closed contact positions, means including a movable element for mechanically controlling the contact position of the pair of contact members of the contact set, means for moving the contact set, means for moving the control element, and means responsive to the movement of the contact set to a predetermined position for preventing further movement thereof. More specifically, in the circuit controlling device, there are provided a first motor operable to rotate the contact set step-by-step about an axis, and a second motor operable to rotate the control element step-by-step about the same axis. Also, the means responsive to the movement of the contact set to a predetermined position for preventing further movement thereof includes an arrangement for arresting the operation of the first motor. The last-mentioned means positively prevents the contact set from being advanced from a start position forwardly and then back through the start position.

In accordance with a further feature of the invention, the circuit controlling device is so constructed and arranged that it is capable of controlling, in a predetermined order, the operations of a plurality of devices in accordance with the correlated numerical values of predetermined sequences of operations. Specifically, the movable contact set includes a plurality of pairs of cooperating contact members, each of the pairs of cooperating contact members of the contact set having open and closed contact positions, and means including a movable element for controlling the contact positions of the pairs of cooperating contact members of the contact set. The contact set and the control element are so constructed and arranged that a first pair of cooperating contact members occupies a predetermined one of the contact positions only when the contact set and the control element occupy their start positions and positions displaced equal distances from their start positions, and that a second pair of cooperating contact members occupies a predetermined one of the contact positions only when the contact set and the control element occupy their start positions and positions displaced less than a predetermined distance from each other.

Figure 1:
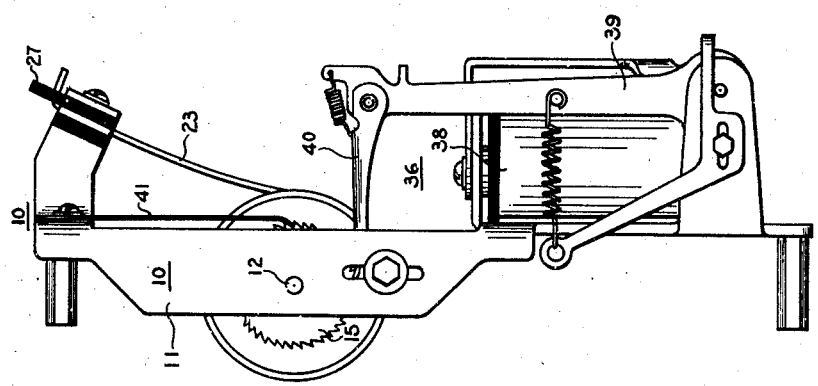

The novel features believed to be characteristic of the invention are set forth with particularity in the appended claims. The invention both as to its organization and method of operation, together with further objects and advantages thereof, will best be understood by reference to the specification, taken in connection with the accompanying drawings, in which Fig. 1 is a side elevational view of a circuit controlling device having embodied therein the features of the present invention; Fig. 2 is a front elevational view of the device; Fig. 3 is a fragmentary side elevational view of the upper portion of the device taken along the line 3—3 of Fig. 2; Fig. 4 is a diagrammatic illustration of the circuit connections between the slip rings and the contact set of the device; and Fig. 5 is a schematic circuit diagram illustrating one practical application of the device.

Referring now more particularly to Figs. 1 and 2 of the drawings, the circuit controlling device there illustrated comprises a supporting frame 10 provided with spaced-apart side members 11 in which the opposite ends of a transversely extending rotatable shaft 12 are journaled. A structure comprising a group of slip rings 13, a first member or contact set 14 and a ratchet wheel 15 is rotatably mounted upon the shaft 12 between the side members 11; and a second member or control element 16 and a ratchet wheel 17 are securely fastened to the shaft 12 between the side members 11.

The group of slip rings 13 comprises the slip rings 18, 19, 20 and 21, which are electrically insulated from each other and from the remainder of the structure by an arrangement including a plurality of insulating members 22 disposed between the slip rings. A group of brushes or collectors 23, 24, 25 and 26 are associated with the slip rings 18, 19, 20 and 21, respectively, and serve to extend electrical connections thereto. The brushes 23, 24, 25 and 26 are carried by an insulating terminal block 27 secured to the supporting frame 10 of the device and are connected to corresponding outgoing conductors. The contact set 14 comprises a plurality of pairs of cooperating contact members 28, 29 and 30, each of the contact members of each pair being formed of flexible spring metal and carrying an electrical contact formed of platinum or other arc resisting material. The cooperating contact members of each pair are electrically insulated from each other, from the contact members of adjacent pairs, and from the remainder of the structure by an arrangement including a plurality of insulating members 31 disposed between the contact members. The cooperating contact members of each pair are biased toward each other in order to bring the electrical contacts carried thereby into engaged relation or closed contact position, and are capable of being moved away from each other in order to bring the electrical contacts carried thereby into disengaged relation or open contact position. As best shown in Fig. 4, a circuit arrangement is provided including a conductor 50 for connecting the right-hand contact member of each of the pairs of cooperating contact members 28, 29 and 30 to the slip ring 18, and including conductors 51, 52 and 53 for connecting the left-hand contact member of each of the pairs of cooperating contact members 28, 29 and 30, respectively, to the slip rings 19, 20 and 21, respectively.

The control element 16, as best shown in Figs. 2 and 3, comprises two transversely extending arms 32ª and 32ᵇ to which are respectively secured two cylindrical insulating members 33 and 34, and between which is secured an arcuate shaped insulating member 35. The insulating members 33, 34 and 35 are associated, respectively, with the pairs of cooperating contact members 28, 29 and 30, each insulating member being adapted to be brought between the cooperating contact members of the associated pair in order to move the cooperating contact members away from each other, thereby to move the electrical contacts carried by the cooperating contact members from closed contact position into open contact position.

The structure comprising the group of slip rings 13, the contact set 14 and the ratchet wheel 15 is rotated as a unit step-by-step about the shaft 12 by a first mechanism 36; and the shaft 12 carrying the control element 16 and the ratchet wheel 17 is rotated step-by-step in the bearings formed in the side members 11 by a second mechanism 37. The mechanism 36 is of the stepping type and essentially comprises a motor magnet 38, an armature 39, a pawl 40, the ratchet wheel 15 and a holding detent 41. The mechanism 37 is of the same construction and includes a motor magnet 42 and the ratchet wheel 17. The mechanical construction of these stepping mechanisms may be substantially the same as that disclosed in United States Patent No. 1,794,888, John Erickson, granted March 3, 1931. Each of the ratchet wheels 15 and 17 comprises the same number of equally spaced-apart teeth, and for purposes of illustration it is assumed that each of these ratchet wheels comprises fifty equally spaced-apart teeth disposed about its periphery. Hence, from the foregoing, it will be understood that upon each operation of the stepping mechanism 36 the structure including the group of slip rings 13 and the contact set 14 will be rotated one step in a clockwise direction, as viewed in Fig. 1, about the axis of the shaft 12; and upon each operation of the stepping mechanism 37 the shaft 12 carrying the control element 16 will be rotated one step in a clockwise direction about this same axis.

The contact set 14 and the control element 16 occupy the initial or start positions illustrated in Figs. 3 and 5, when the device is in a non-operated condition, these positions of the contact set and the control element with respect to each other constituting a synchronous position. When operation of the device is initiated, the contact set 14 is first rotated a predetermined number of steps in a clockwise direction from its start position, thereby causing the pairs of cooperating contact members to be moved in a predetermined order from one contact position to the other. The control element 16 is then rotated a predetermined number of steps in a clockwise direction from its start position, thereby causing the pairs of cooperating contact members to be moved in a predetermined order from the other contact position back to the one contact position. More specifically, the associated contact set 14 and the control element 16 are so constructed and arranged that, when the contact set 14 and the control element 16 occupy their initial or start positions, the insulating member 33 is disposed one step behind or forty-nine steps ahead of the associated pair of cooperating contact members 28, the insulating member 34 is disposed between the associated pair of cooperating contact members 29, and the rear end of the insulating member 35 is disposed between the associated pair of cooperating contact members 30. Thus, in the start positions of the contact set 14 and the control element 16, the pair of cooperating contact members 28 occupies its closed contact position, and the pairs of cooperating contact members 29 and 30 occupy their open contact positions. The cylindrical insulating members 33 and 34 are formed having a diameter which is so proportioned with respect to the distance moved by the associated pairs of cooperating contact members 28 and 29 that the insulating member 34 is removed from between the associated pair of cooperating contact members 29 upon the first step of the contact set 14 from its start position; and that the insulating member 33, when disposed between the associated pair of cooperating contact members 28, is removed from therebetween upon the first step of the control element 16 from its start position. The arcuate shaped insulating member 35 is formed having a length such that this insulating member is disposed between the associated pair of cooperating contact members 30 during a predetermined number of steps of the contact set 14 from its start position. For purposes of illustration it is assumed that the insulating member 35 is formed having a length such that this insulating member remains in its position disposed between the associated pair of cooperating contact members 30 during the first thirteen steps of the contact member 14 from its start position. Thus it will be apparent that, when the contact set 14 is advanced any number of steps between one and thirteen from its start position, the insulating member 33 is disposed ahead of the associated pair of cooperating contact members 28, the insulating member 34 is disposed behind the associated pair of cooperating contact members 29, and the insulating member 35 is disposed between the associated pair of cooperating contact members 30. Thus, in the first through the thirteenth positions of the contact set 14 from its start position, the pairs of cooperating contact members 28 and 29 occupy their closed contact positions and the pair of cooperating contact members 30 occupies its open contact position. When the contact set 14 is advanced into its fourteenth position from its start position, the insulating member 35 is removed from between the associated pair of cooperating contact members 30. Accordingly, in this position of the contact set 14, each of the pairs of cooperating contact members 28, 29 and 30 occupies its closed contact position. If the contact set 14 should be advanced into its forty-ninth position from its start position, which position is only one step behind its start position, the insulating member 33 is brought between the associated pair of cooperating contact members 28, thereby moving this pair of cooperating contact members into its open contact position. As will be more fully described subsequently, the pair of cooperating contact members 28 is included in a circuit for controlling the energization of the motor magnet 38 of the stepping mechanism 36, which mechanism causes the contact set 14 to be rotated from its start position. Thus, when the contact set 14 is advanced into its forty-ninth position from its start position, the circuit for controlling the energization of the motor magnet 38 is interrupted, thereby arresting the operation of the motor magnet 38 and positively preventing the contact set 14 from being advanced into its fiftieth or start position. The control element 16 is then advanced step-by-step from its start position by the motor magnet 42. As the control element 16 is advanced from its start position, the insulating member 33 is disposed ahead of the associated pair of cooperating contact members 28 and the insulating members 34 and 35 are disposed behind the associated pair of cooperating contact members 29 and 30 until the control element 16 is moved a predetermined number of steps from its start position or into a position disposed thirteen steps behind the position of the contact set 14, at which time the insulating member 35 is moved between the associated pair of cooperating contact members 30. Thus, the associated pairs of cooperating contact members 28, 29 and 30 remain in closed contact positions until the control element 16 is advanced to a position disposed thirteen steps behind the position of the contact set 14, at which time the pair of cooperating contact members 30 is moved to its open contact position. The pairs of cooperating contact members 28 and 29 remain in their closed contact positions and the pair of cooperating contact members 30 remains in its open contact position until the control element 16 is advanced into a position corresponding to the position of the contact set 14, at which time a new synchronous position is established and the pair of cooperating contact members 29 is moved to its open contact position. These positions of the contact member 14 and the control element 16 constitute start positions for the contact member 14 and the element 16 upon each operation of the device.

Referring now more particularly to Fig. 5, there is diagrammatically illustrated a practical circuit arrangement utilizing a circuit controlling device of the construction described for controlling the operations of the two devices 43 and 44, the circuit controlling device being connected and arranged to correlate with respect to numerical values a first predetermined sequence of operations of an impulsing device 45 with a related second predetermined sequence of operations of an impulsing device 46. In this arrangement there are provided circuits for controlling individually the energization of the motor magnets 38 and 42 of the circuit controlling device, and circuits for controlling individually the operations of the devices 4 and 44. The circuit for controlling the energization of the motor magnet 38 extends from one terminal of a grounded battery, not shown, by way of contacts included in the impulsing device 45, the winding of the motor magnet 38, a conductor 54, the slip ring 19, the conductor 51, the pair of cooperating contact members 28, the conductor 50, the slip ring 18, and the conductor 55 to ground. The circuit for controlling the energization of the motor magnet 42 extends from one terminal of grounded battery, by way of contacts included in the impulsing device 46, the winding of the motor magnet 42, a conductor 56b, a conductor 56, the slip ring 20, the conductor 52, the pair of cooperating contact members 29, the conductor 50, the slip ring 18, and the conductor 55 to ground. The circuit for controlling the operation of the device 43 extends from one terminal of grounded battery, by way of the device 43, a conductor 57, the slip ring 21, the conductor 53, the pair of cooperating contact members 30, the conductor 50, the slip ring 18, and the conductor 55 to ground; and the circuit for controlling the operation of the device 44 extends from one terminal of grounded battery, by way of the device 44, a conductor 56ª, the conductor 56, the slip ring 20, the conductor 52, the pair of cooperating contact members 29, the conductor 50, the slip ring 18, and the conductor 55 to ground.

During the operation of the arrangement, and when the contact set 14 and the control element 16 of the circuit controlling device occupy their initial or start positions, the above-traced circuits for controlling the energization of the motor magnets 38 and 42 are respectively interrupted at the contacts included in the impulsing device 45, and at the contacts included in the impulsing device 46 and the pair of cooperating contact members 29; while the above-traced circuits for controlling the operations of the devices 43 and 44 are respectively interrupted at the pairs of cooperating contact members 30 and 29. Upon a first predetermined sequence of operations, the impulsing device 45 operates repeatedly to close and open the contacts included therein a corresponding number of times, thereby to complete and interrupt a corresponding number of times the circuit for controlling the energization of the motor magnet 38, whereupon the contact set 14 is rotated step-by-step a corresponding number of steps or to a corresponding position disposed from its start position. For example, if the first predetermined sequence of operations comprises forty-eight operations, the contact set 14 is rotated to its forty-eighth position P48 from its start position P50. Upon the rotation of the contact set 14 into its first position P1, the circuit for controlling the operation of the device 44 is completed at the pair of cooperating contact members 29, and the device 44 is operated. Also, the circuit for controlling the energization of the motor magnet 42 is prepared at the pair of cooperating contact members 29, this circuit being interrupted at this time at the contacts included in the impulsing device 46. Upon the rotation of the contact set 14 into its fourteenth position P14, the circuit for controlling the operation of the device 43 is completed at the pair of cooperating contact members 30, and the device 43 is operated. The devices 43 and 44 remain operated during the remainder of the rotation of the contact set 14 to its forty-eighth position P48, whereupon the circuit for controlling the energization of the motor magnet 38 is interrupted at the contacts included in the impulsing device 45.

Upon a second predetermined sequence of operations, the impulsing device 46 operates repeatedly to close and open the contacts included therein a corresponding number of times, thereby to complete and interrupt a corresponding number of times the circuit for controlling the energization of the motor magnet 42, whereupon the control element 16 is rotated step-by-step a corresponding number of steps or to a corresponding position disposed from its start position. For example, if the second predetermined sequence of operations comprises forty-eight operations, the control element 16 is rotated to its forty-eighth position P48 from its start position P50. Upon the rotation of the control element 16 into its thirty-fifth position, the circuit for controlling the operation of the device 43 is interrupted at the pair of cooperating contact members 30, causing interruption of the operation of the device 43; and, upon the rotation of the control element 16 into its forty-eighth position, the circuit for controlling the operation of the device 44 is interrupted at the pair of cooperating contact members 29, causing interruption of the operation of the device 44. Thus, the device 44 is operated thirteen steps before the device 43 is operated, and the device 44 remains operated thirteen steps after the operation of the device 43 is interrupted.

Also, when the control element 16 is rotated the same number of steps from its start position as the contact set 14 has been rotated from its start position, or the control element 16 is rotated to a position corresponding to the position of the contact set 14, further rotation of the control element 16 is arrested regardless of the continued operation of the impulsing device 46, as the circuit for controlling the energization of the motor magnet 42 is interrupted at the pair of cooperating contact members 29 at this time. Thus, the contact set 14 and the control element 16 are so constructed and arranged that the control element 16 is rotated from its start position a number of steps corresponding to the number of operations of the second predetermined sequence of operations, provided the number of operations of the second predetermined sequence of operations does not exceed the number of operations of the first predetermined sequence of operations. In case the number of operations of the second sequence exceeds the number of operations of the first sequence, the element 16 is rotated from its start position a number of steps corresponding to the number of operations of the first sequence. This arrangement prevents the control element 16 from being advanced ahead of the contact set 14, and the consequent disturbance of the predetermined order of operations of the device 43 and 44.

Also, the contact set 14 and the control element 16 are so constructed and arranged that the contact set 14 is prevented from being rotated from its start position forwardly and back through its start position. For example, if the first predetermined sequence of operations comprises more than forty-nine operations, the contact set 14 is rotated only to its forty-ninth position P49, at which time further rotation of the contact set 14 is arrested, regardless of the continued operation of the impulsing device 45, as the circuit for controlling the energization of the motor magnet 38 is interrupted at the pair of cooperating contact members 28 at this time. Thus, the contact set 14 is rotated from its start position a predetermined number of steps corresponding to the number of operations of the first predetermined sequence of operations, provided the number of operations of the first predetermined sequence of operations does not exceed forty-nine. In case the number of operations of the first sequence exceeds forty-nine, the contact set is rotated from its start position into its forty-ninth position.

From the foregoing description it will be apparent that a circuit controlling device is provided, which includes an arrangement for correlating with respect to numerical values a first predetermined sequence of operations with a related second predetermined sequence of operations, and which is adapted to control, in a predetermined order, the operations of a plurality of devices in accordance with the correlated numerical values.

While there has been described what is at present considered to be the preferred embodiment of the invention, it will be understood that various modifications may be made therein without departing from the invention, and it is intended in the appended claims to cover all such embodiments as fall within the true spirit and scope of the invention.

What is claimed is:

1. In a cyclically operating circuit controlling device, first and second members independently movable in the same direction along a common path, said members having a synchronous position with respect to each other which may occur at any point along said path, circuit controlling contacts controlled jointly by said members and closed when said members occupy a predetermined position with respect to each other, means for moving said first member away from a synchronous position, thereby to initiate a cycle of operation, means for arresting further movement of said first member after a predetermined movement thereof away from any synchronous position, means for moving said second member to establish a new synchronous position, thereby to complete the cycle of operation, and means for positively arresting further movement of said second member when a new synchronous position is established.

2. In a cyclically operating circuit controlling device, first and second members independently movable in the same direction along a common path, said members having a synchronous position with respect to each other which may occur at any point along said path, circuit controlling contacts controlled jointly by said members and closed when said members occupy a predetermined position with respect to each other, means including a first motor operable to move said first member away from a synchronous position, thereby to initiate a cycle of operation, means for arresting further operation of said first motor after a predetermined movement of said first member away from any synchronous position, means including a second motor operable to move said second member to establish a new synchronous position, thereby to complete the cycle of operation, and means for positively arresting further operation of said second motor when a new synchronous position is established.

3. In a cyclically operating circuit controlling device, first and second members independently movable step by step in the same direction along a common path, said members having a synchronous position with respect to each other which may occur at any step along said path, circuit controlling contacts controlled jointly by said members and closed when said members occupy a predetermined position with respect to each other, means for moving said first member step by step away from a synchronous position, thereby to initiate a cycle of operation, means for arresting further movement of said first member after said first member is moved a predetermined number of steps away from any synchronous position, means for moving said second member step by step to establish a new synchronous position, thereby to complete the cycle of operation, and means for positively arresting further movement of said second member when a new synchronous position is established.

4. In a cyclically operating circuit controlling device, first and second members independently rotatable in the same direction about a common axis, said members having a synchronous position with respect to each other which may occur at any angular position, circuit controlling contacts controlled jointly by said members and closed when said members occupy a predetermined position with respect to each other, means for rotating said first member away from a synchronous position, thereby to initiate a cycle of operation, means for arresting further rotation of said first member after a predetermined rotation thereof away from any synchronous position, means for rotating said second member to establish a new synchronous position, thereby to complete the cycle of operation, and means for positively arresting further rotation of said second member when a new synchronous position is established.

5. In a cyclically operating circuit controlling device, first and second members independently rotatable step by step in the same direction about a common axis, said members having a synchronous position with respect to each other which may occur at any angular step, circuit controlling contacts controlled jointly by said members and closed when said members occupy a predetermined position with respect to each other, means including a first motor operable to rotate said first member step by step away from a synchronous position, thereby to initiate a cycle of operation, means for arresting further operation of said first motor after said first member is rotated a predetermined number of steps away from any synchronous position, means including a second motor operable to rotate said second member step by step to establish a new synchronous position, thereby to complete the cycle of operation, and means for positively arresting further operation of said second motor when a new synchronous position is established.

6. In a cyclically operating circuit controlling device, first and second members independently movable in the same direction along a common path, said members having a synchronous position with respect to each other which may occur at any point along said path, a plurality of pairs of circuit controlling contacts controlled jointly by said members, each of said pairs of contacts having open and closed contact positions, means for moving said first member away from a synchronous position, thereby to initiate a cycle of operation, means for moving said second member to establish a new synchronous position, thereby to complete the cycle of operation, said members being so constructed and arranged that a first pair of contacts occupies a predetermined one of said contact positions only when said members occupy synchronous positions and that a second pair of contacts occupies a predetermined one of said contact positions only when said first member is moved a predetermined distance away from any synchronous position, means controlled by said second pair of contacts for arresting further movement of said first member after said first member is moved said predetermined distance away from any synchronous position, and means controlled by said first pair of contacts for arresting further movement of said second member when a new synchronous position is established.

7. In a cyclically operating circuit controlling device, first and second members independently movable in the same direction along a common path, said members having a synchronous position with respect to each other which may occur at any point along said path, a plurality of pairs of circuit controlling contacts controlled jointly by said members, each of said pairs of contacts having open and closed contact positions, means including a first motor operable to move said first member away from a synchronous position, thereby to initiate a cycle of operation, means including a second motor operable to move said second member to establish a new synchronous position, thereby to complete the cycle of operation, said members being so constructed and arranged that a first pair of contacts occupies an open contact position only when said members occupy synchronous positions and that a second pair of contacts occupies an open contact position only when said first member is moved a predetermined distance away from any synchronous position, an operating circuit for said first motor including said second pair of contacts, and an operating circuit for said second motor including said first pair of contacts.

8. In a cyclically operating circuit controlling device, first and second members independently movable in the same direction along a common path, said members having a synchronous position with respect to each other which may occur at any point along said path, a plurality of pairs of circuit controlling contacts controlled jointly by said members, each of said pairs of contacts having open and closed contact positions, means for moving said first member step by step away from a synchronous position, thereby to initiate a cycle of operation, means for moving said second member step by step to establish a new synchronous position, thereby to complete the cycle of operation, said members being so constructed and arranged that a first pair of contacts occupies a predetermined one of said contact positions only when said members occupy synchronous positions and that a second pair of contacts occupies a predetermined one of said contact positions only when said first member is moved a predetermined number of steps away from any synchronous position, means controlled by said second pair of contacts for arresting further movement of said first member after said first member is moved said predetermined number of steps away from any synchronous position, and means controlled by said first pair of contacts for arresting further movement of said second member when a new synchronous position is established.

9. In a cyclically operating circuit controlling device, first and second members independently rotatable step by step in the same direction about a common axis, said members having a synchronous position with respect to each other which may occur at any angular step, a plurality of pairs of circuit controlling contacts controlled jointly by said members, each of said pairs of contacts having open and closed contact positions, means including a first motor operable to rotate said first member step by step away from a synchronous position, thereby to initiate a cycle of operation, means including a second motor operable to rotate said second member step by step to establish a new synchronous position, thereby to complete the cycle of operation, said members being so constructed and arranged that a first pair of contacts occupies a predetermined one of said contact positions only when said members occupy synchronous positions and that a second pair of contacts occupies a predetermined one of said positions only when said first member is rotated a predetermined number of steps away from any synchronous position, means controlled by said second pair of contacts for arresting further operation of said first motor after said first member is rotated said predetermined number of steps away from any synchronous position, and means controlled by said first pair of contacts for arresting further operation of said second motor when a new synchronous position is established.

10. In a cyclically operating circuit controlling device, first and second members independently movable in the same direction along a common path, said members having a synchronous position with respect to each other which may occur at any point along said path, a plurality of pairs of circuit controlling contacts controlled jointly by said members, each of said pairs of contacts having open and closed contact positions, means for moving said first member away from a synchronous position, thereby to initiate a cycle of operation, means for moving said second member to establish a new synchronous position, thereby to complete the cycle of operation, said members being so constructed and arranged that a first pair of contacts occupies a predetermined one of said contact positions only when said members occupy synchronous positions and that a second pair of contacts occupies a predetermined one of said contact positions only when said first member is moved a predetermined distance away from any synchronous position and that a third pair of contacts occupies a predetermined one of said contact positions only when said members occupy synchronous positions and positions displaced less than a predetermined distance from synchronous positions, means controlled by said second pair of contacts for arresting further movement of said first member when said first member is moved said predetermined distance away from any synchronous position, means controlled by said first pair of contacts for arresting further movement of said second member when a new synchronous position is established, and an operating circuit controlled by said third pair of contacts.

HERBERT F. OBERGFELL.